United States Patent [19]
Opel

[11] 3,770,071
[45] Nov. 6, 1973

[54] TRACTION DEVICE FOR MOTOR VEHICLE

[76] Inventor: George E. Opel, 4031 Kottler Dr., Lafayette Hill, Pa. 19444

[22] Filed: Jan. 24, 1972

[21] Appl. No.: 220,348

[52] U.S. Cl..................... 180/15, 180/82 R, 188/5, 188/80
[51] Int. Cl............................................ B60b 15/00
[58] Field of Search................. 180/15, 24.02, 82 R; 188/4 R, 5, 80; 280/43.2

[56] References Cited
UNITED STATES PATENTS

| | | | |
|---|---|---|---|
| 2,818,139 | 12/1957 | Sutter | 180/15 X |
| 628,514 | 7/1899 | Zimmermann | 180/15 X |
| 687,957 | 12/1901 | Fortner | 180/15 |
| 1,506,952 | 9/1924 | Stackhouse | 180/15 |
| 811,403 | 1/1906 | Inglis | 180/15 |
| 668,262 | 2/1901 | Melvin | 180/15 X |
| 1,183,278 | 5/1916 | De Arrigunaga | 180/15 |
| 3,423,856 | 1/1969 | Fiske | 180/15 X |
| 2,463,634 | 3/1949 | Martinis | 180/15 |

FOREIGN PATENTS OR APPLICATIONS

| | | | |
|---|---|---|---|
| 1,057,200 | 2/1967 | Great Britain | 180/15 |

Primary Examiner—Evon C. Blunk
Assistant Examiner—W. Scott Carson
Attorney—Henry N. Paul, Jr. et al.

[57] ABSTRACT

In a motor vehicle, a freely rotatable auxiliary rear wheel equipped with an anti-skid tire is supported by an elevator mechanism in raised position behind each rear drive wheel. When driving conditions are hazardous, as in snow or on icy roads, the auxiliary wheels are lowered into surface contact with the roadway in alignment with the tracks of the normal rear drive wheels. In lowering the auxiliary wheels into road contact, the elevator mechanisms actuate lever linkages which apply a jacking force upwardly on the normal rear drive-axle housings. In their lowered road-contact positions, the auxiliary wheels are driven and braked by the rear drive wheels through spiked idler wheels which are pulled into spring-loaded contact with the tread surfaces of the tires of the rear drive wheels and also the auxiliary wheels. Spring-loaded pistons maintain the idler wheels tightly against the tires of the rear drive wheels and auxiliary wheels.

2 Claims, 6 Drawing Figures

PATENTED NOV 6 1973 3,770,071

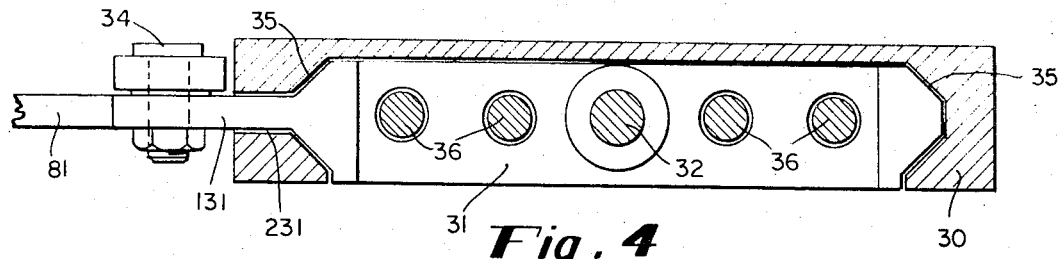
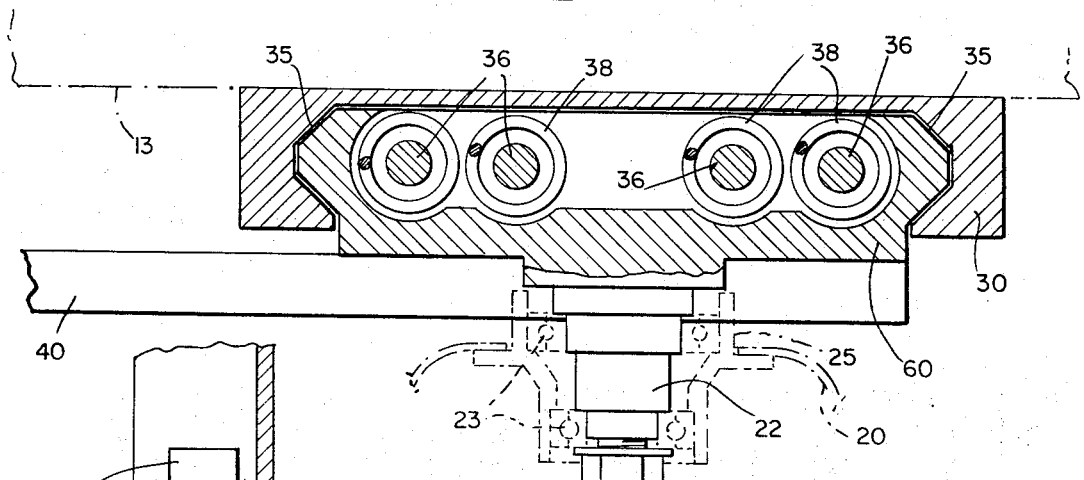
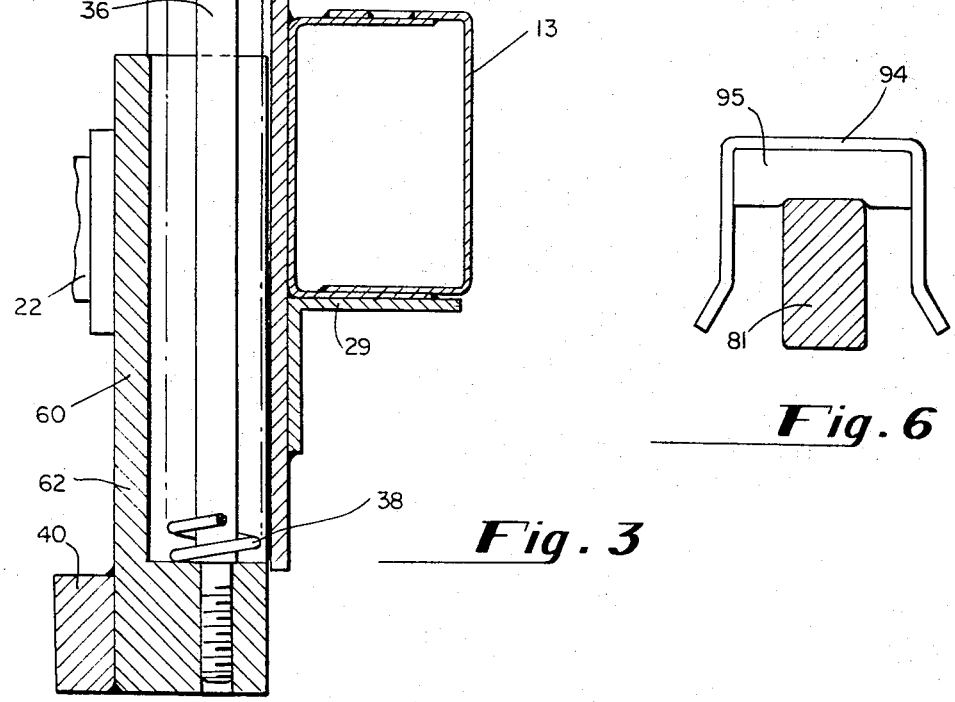

TRACTION DEVICE FOR MOTOR VEHICLE

BACKGROUND OF THE INVENTION

One of the major unsolved problems in the automotive field is that of providing good road traction in snow or on icy roads while at the same time avoiding the damaging use of chains or metal studs on dry road surfaces.

At present, metal-studded snow tires are in wide use but experience with these tires is revealing that they cause serious damage to road surfaces when used on surfaces which are free of ice and snow.

It has been proposed, heretofore, to provide the motor vehicle with auxiliary anti-skid wheels which, when not in use, are carried in a raised position and which are lowered into road-surface contact when needed. Such an auxiliary wheel arrangement is disclosed, for example, in U. S. Pat. No. 2,818,139, issued Dec. 31, 1957 to E. W. Sutter.

SUMMARY OF THE INVENTION

An object of the present invention is to provide an auxiliary-wheel anti-skid mechanism for motor vehicles which is an improvement over that disclosed in the aforesaid Sutter U.S. Pat. No. 2,818,139.

Another object is to provide an auxiliary-wheel anti-skid mechanism so designed and constructed that when the auxiliary wheels are lowered from their raised position into road-surface contact, a reactive force having an upward component is imposed upon the rear axle housing of the car, thereby increasing the capability of the lowering mechanism to press the auxiliary wheels into firm contact with the icy or snowy road surface.

A further object is to provide an anti-skid mechanism of the foregoing type in which freely rotatable auxiliary wheels, when lowered into road-surface contact, are driven peripherally by the rear drive wheels through idler wheels which are maintained spring-loaded against the tread surfaces of the tires of both the rear drive wheels and the auxiliary anti-skid wheels.

Another object is to mount a pair of auxiliary anti-skid wheels that when the auxiliary wheels are in their raised storage positions their weight is spring cushioned from the sprung frame of the car.

The foregoing objects are achieved, in accordance with the present invention, by providing a pair of auxiliary anti-skid freely-rotatable wheels, one behind each rear drive wheel. The auxiliary wheels are spring mounted upon an elevator mechanism which raises and lowers the wheels into and out of road-surface contact. The elevator mechanism is supported on the sprung frame of the vehicle. The arrangement is such that when the elevator mechanism lowers the auxiliary wheels into road-surface contact, a fulcrumed lever system is actuated by the elevator mechanism to provide an upward force on the housing of the normal rear drive axle, thereby tending to jack up the upsprung rear axles, thereby to increase the downward thrust on the auxiliary wheels and in so doing to improve the traction of the auxiliary wheels on the icy or snowy road surface.

It is another feature of the structural arrangement disclosed in the present application that when the auxiliary wheels are lowered by the elevator mechanism into road-surface contact, the elevator mechanism actuates a cylinder-and-piston pull-down arrangement which pulls idler wheels into close engagement with the peripheral surfaces of the tires of both the rear drive wheels and the auxiliary wheels, and by a spring-loaded arrangement maintains such close engagement despite bumps and irregularities in the road surface.

A further feature of a preferred embodiment of the present invention is that the elevator mechanism lowers and raises the auxiliary wheel along vertical lines perpendicular to the road surface, and not along an arcuate path as would be the case if the raising and lowering mechanism were a pivotal mechanism.

BRIEF DESCRIPTION OF THE DRAWINGS

FIG. 2 also shows the spring-loaded piston mechanism for pulling the idler wheel into spring-loaded engagement with the rear drive and auxiliary wheels. FIG. 2 also shows a portion of the fulcrumed lever mechanism which is actuated by the elevator mechanism, when the auxiliary wheels are lowered, to apply an upward-component force on the housing of the normal rear axle.

FIG. 3 is a view, in section, looking along the line 3—3 of FIG. 2.

FIG. 4 is a view, in section, looking down along the line 4—4 of FIG. 2.

FIG. 5 is a view, in section, looking down along the line 5—5 of FIG. 2.

FIG. 6 is a view along the line 6—6 of FIG. 1 showing the fulcrumed lever engaging and applying an upward force on a plate secured, as by U-bolts, to the rear axle housing.

DETAILED DESCRIPTION OF THE PREFERRED EMBODIMENTS

Figure 1:
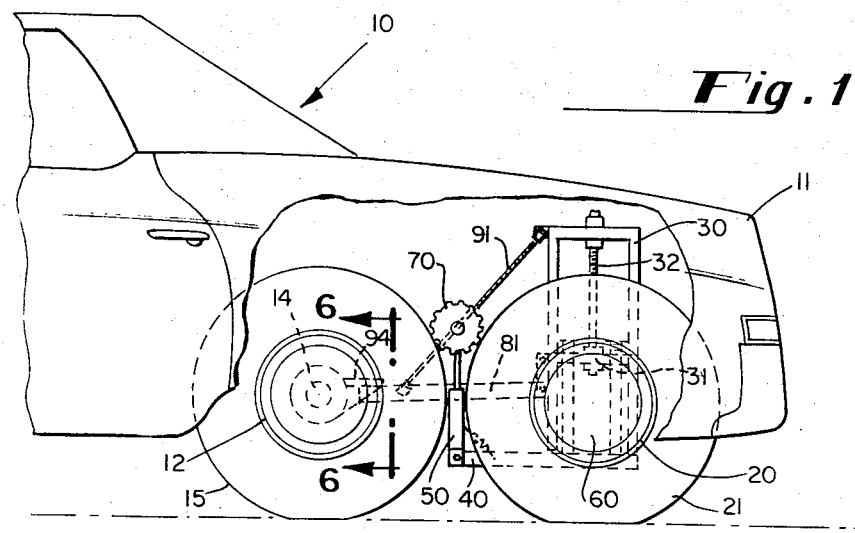
FIG. 1 is a fragmentary side elevational view of the rearward portion of a passenger motor vehicle incorporating the present invention.

Referring now to the drawings, there is illustrated in FIG. 1 a fragmentary portion of one side (the left side) of the rear portion of a passenger automobile having a rear drive wheel 12 journaled on a rear axle 14. Mounted on rear wheel 12 is a pneumatic tire 15.

For convenience, in the present application, the components at one side only (the left side) of the rear portion of the automobile will be described. It is to be understood, however, that identical components are present on the other or right side of the automobile.

In accordance with the present invention, an auxiliary anti-skid wheel 20, equipped, for example, with metal-studded snow tire 21, is mounted on each side of the car rearwardly of the rear drive wheel 12. The auxiliary wheel 20 is so mounted that when it is lowered from its raised stored position into contact with the road surface, the track of the auxiliary wheel is in alignment with the track of the rear drive wheel 12.

In a presently preferred embodiment of the present invention, and as seen in the drawings, auxiliary wheel 20 is raised and lowered by an elevator or lift mechanism which rides up and down in channels or tracks 35 in the walls of the elevator housing 30. As seen in FIG. 3, elevator housing 30 is supported on a bracket 28 welded or otherwise fastened to the box frame 13 of the automobile. The elevator mechanism within housing 30 includes a bar 31 (FIG. 4) which functions as a lifting-and-compression bar. Bar 31 has a threaded central hole into which is threaded a stem or screw 32. Screw 32 extends upwardly through the upper plate in housing 20 through a pair of thrust bearings represented schematically by bushing 33. Screw 32 may be driven by any suitable means, as by a reversible fluid motor keyed or otherwise connected to the screw 32, the operation of the fluid motor being under the control of the driver of the automobile.

Figure 2:
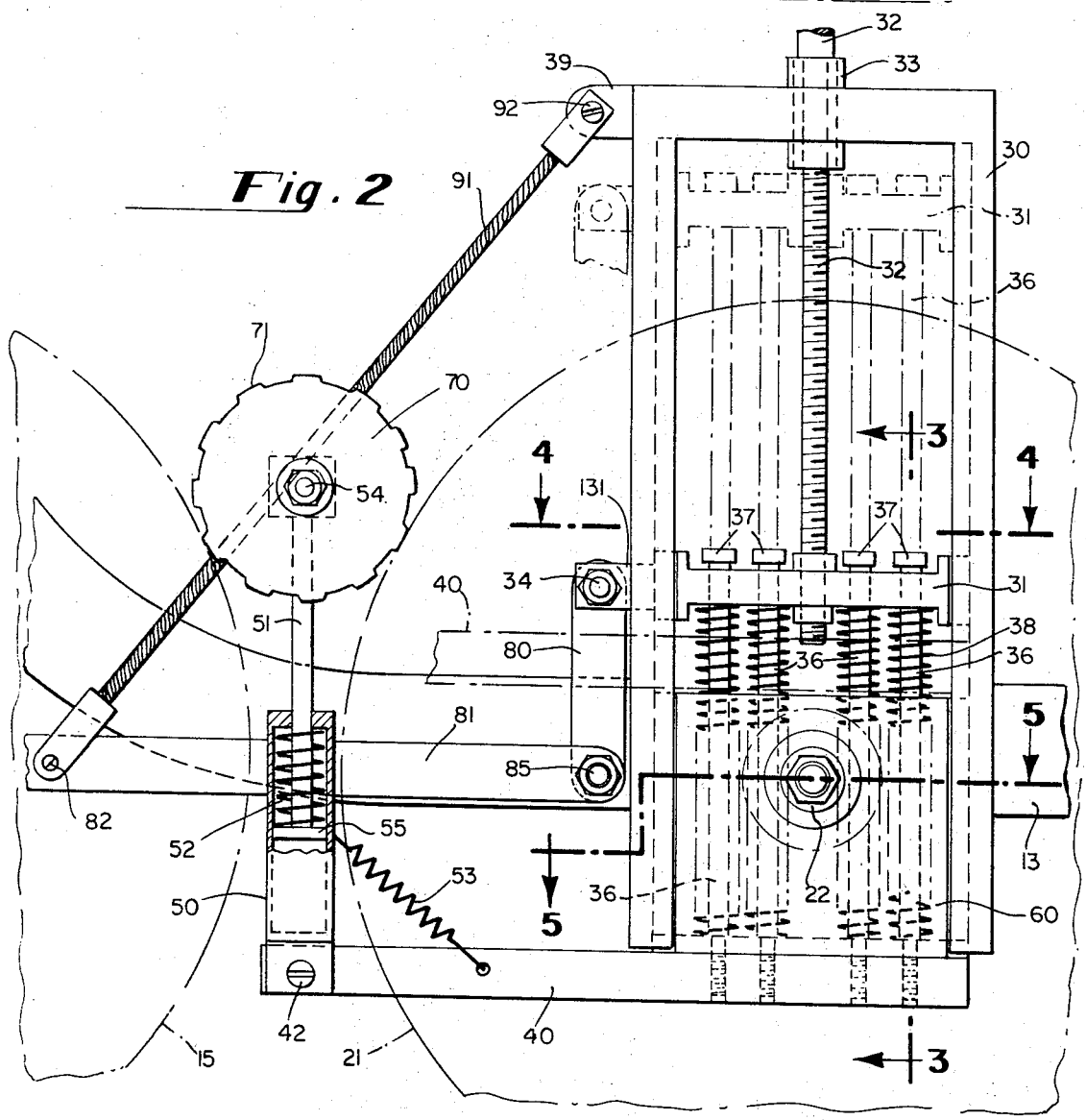
FIG. 2 is an enlarged side elevational view showing details of the elevator or lift mechanism for raising and lowering the auxiliary wheels.

Elevator bar 31 has a plurality of holes through which elongated rods 36 pass. Four such rods are shown. As seen in FIG. 2, the upper ends of rods 36 have enlarged heads 37 whose cross dimensions are greater than the diameters of the holes. Thus, rods 36 are supported on elevator bar 31. Bar 31 has a forward extension 131 which passes through a slot 231 in the upper part of the forward wall of housing 30.

The bottom of housing 30 is open. Supported by the four rods 36 below elevator bar 31 is an elevator carriage 60 which is adapted to ride up and down in the channels or tracks 35 of the housing 30, as seen in FIG. 5. Elongated helical compression springs 38 embrace the rods 36 and extend between the undersurface of bar 31 and the floor of carriage 60.

Extending forwardly from the bottom of elevator carriage 60 along a line which is inside the line of the wheels 12 and 20 is a bracket 40 and secured pivotally to the forward end of bracket 40, as by pin 42, is the lower end of a cylinder 50 having a piston 51 which is spring loaded downwardly by compression spring 52. The uppermost end of the projecting piston 51 is provided with an axis 54 with carries a freely rotatable idler wheel 70 having a spiked or abrasive peripheral surface 71. Wheel 70 may preferably be aluminum, but may be of steel, hard plastic, or other material.

As shown in FIGS. 3 and 5, secured to the side wall 62 of the carriage 60 is an auxiliary axle 22 for receiving the hub 25 of auxiliary wheel 20. Wheel 20 is journaled for rotation about axle 22, as by bearings 23. Thus, auxiliary wheel 20 is raised and lowered by carriage 60 which in turn is raised and lowered by the screw driven elevator bar 31.

Idler wheel 70 is held against the tread surface of the tire of the auxiliary wheel 20 by a spring 53 which is connected between cylinder 50 and bracket 40.

As previously described, elevator bar 31 has a forwardly extending portion 131 which extends through a slot 231 in the upper port of the forward wall of the housing 30. Secured to extension 131, as by bolt 34, is the upper end of a lever 80 the lower end of which is pivotally pinned, as by pin 85, to a forwardly extending lower 81. Intermediate the two ends of lever 81, but closer to its forward end, is a fulcrum pin 82 to which the lower end of a flexible cable 91 is pivotally secured. The upper end of cable 91 is pivotally secured, as by a pin 92, to a fixed boss 39 which extends forwardly at the upper end of elevator housing 30. When the auxiliary wheel 20 is lowered by bar 31 and carriage 60 to its fully lowered road-contact position, lever 81 is in the lowered position indicated in solid lines in FIG. 2. In this lowered position of lever 81, and because of the fulcrum support by cable 91 at fulcrum pin 82, an upward component of force is applied by the forward end of lever 81 against the cushioned undersurface 95 of bracket 94 secured as by U-bolts to the rear axle housing. This is illustrated in FIGS. 1 and 6.

OPERATION

When road conditions are dry or not slippery, auxiliary anti-skid wheels 20 are carried in their elevated storage positions. In their storage positions, auxiliary wheels 20 and their tires 21 may be hidden, at least for the most part, behind the rear fenders 11 of the automobile body 10. In this storage positions, auxiliary wheels 20 are free from the unsprung rear axles 14 and from the rear drive wheels 12. This desirable condition results from the fact that the auxiliary wheels 20 are carried by the sprung box frame 13 of the automobile by means which will now be summarized.

As already described, auxiliary wheels 20 in their raised storage positions are carried by the elevator carriages 60 which are supported on each side of the car by the rods 36 which in turn are supported on the screw driven elevator bars 31, as indicated in phantom in FIG. 2. Screws 32, which drive the bars 31, are supported as by thrust bearings in the top plate 35 of elevator housing 30. Since the elevator housing 30 is welded to box frame 13, it will be seen that the auxiliary wheels 20 are supported by the frame of the car independently of the rear axles 14 and rear drive wheels 12.

When driving conditions become hazardous, due to icy or snowy road surfaces, the operator of the automobile, by means of a suitable control switch, actuates suitable motors, preferably fluid vane motors, to rotate the elevator screws 32 in a direction to cause the nonrotatable bars 31 to move downwardly on the screws 32.

As the elevator bars 31 move downwardly on each side of the car, the four rods 36 which are carried thereby also move downwardly, and so do the elevator carriage 60 and its forwardly extending bracket 40. Since carriage 60 carries the auxiliary wheel 20, the auxiliary wheel likewise moves downwardly until the auxiliary tire 21, which may be a metal-studded snow tire, contacts the road surface. At the instant the auxiliary tire 21 contacts the road surface, the rods 36 and hence carriage 60 are still supported on the bar 31.

As rotation of the screw 32 continues after the anti-skid tire 21 has made contact with the road surface, the continued downward movement of bar 31 is unable to cause an equal downward movement of carriage 60, and accordingly, relative movement occurs between the bar 31 and the carriage 60. The springs 38 which surround the guide rods 36 are compressed and the heads 37 of the rods 36 rise above the bar 31, as illustrated in FIGS. 2 and 3. When the auxiliary anti-skid tire is pressed firmly against the road surface, the rotation of screw 32 is discontinued, either manually, or automatically in response to sensed resistance to further downward movement.

As the bar 31 moves downwardly as described above, the forward extension 131 of bar 31, carrying lever 80 and the rearward end of lever 81, is carried downwardly in a corresponding manner, from the position shown in phantom in FIG. 2 to the position shown in solid line. As the lever 81 moves downwardly, cable 91 which has its upper end connected to a fixed boss 39 on housing 30, pulls lever 81 forwardly due to the fact that the lower end of cable 81 is connected by pin 82 to an intermediate point on lever 81. At about the instant that the tread of the anti-skid tire 21 first touches the ground, the lever 81 reaches a horizontal position, and the forward end of the lever 81 engages the cushioned undersurface 95 of a bracket 94 which is secured as by U-bolts to the housing of the rear drive axle 14. This engagement of the forward end of the lever 81 with the cushioned undersurface of the bracket 94 may occur just before or just about the time the tread of the tire 21 first lightly touches the road surface. As the screw 32 continues to drive elevator bar 31, carriage 60, wheel 20 and tire 21 downward, and because fulcrum pin 82 is held up by cable 91, the forward end of lever 81 applies a force having an upward component on the bracket 94. Thus, the reaction to the downward movement of the auxiliary wheel and tire, after the tire has reached the ground, is transferred from the sprung frame of the motor vehicle to the unsprung rear axle. This is an important feature of the preferred embodiment of the present invention for it permits the elevator mechanism to drive the auxiliary tire firmly against the icy or slippery surface of the road.

When auxiliary wheel 20 is lowered by the mechanism and in the manner described hereinabove, the forwardly-extending bracket 40 is, of course, carried downwardly along with the elevator carriage 60. Since the forward end of bracket 40 is pivotally connected, as by pin 42, to the lower end of the cylinder 50, the cylinder 50 is pulled downwardly at the same rate as the downward rate of movement of the carriage 60. Downward movement of the cylinder 50 pulls downwardly the piston 51, the upper end of which is connected to the axle 54 of idler wheel 70. Spring 53 holds the idler wheel 70 against the tread of the tire 21 of the auxiliary wheel 20. During the first portion of the downward movement, the head 55 of piston 51 is held against the lower end of the cylinder 50 by the fully-extended spring 52. When the idler wheel 70 engages the tread of the rear tire 15, the idler wheel can no longer continue to move downwardly with bracket 40 and, accordingly, spring 52 becomes compressed, to an increasing extent as the piston head 55 rises relative to cylinder 50. As downward movement of carriage 60, bracket 40 and cylinder 50 continues, the idler wheel 70 is pulled into tight spring-loaded engagement with the tread of both tires 15 and 21.

It will be seen that, as a result of the spring-loading by spring 52, the idler wheel 70 is held in tight contact with the threads of both tires, on irregular road surfaces as well as on smooth surfaces. This spring-loaded arrangement also adjusts automatically for tire wear. Idler wheel 70 may preferably be an aluminum wheel with a spiked or abrasive peripheral surface to provide frictional engagement with the treads of tires 15 and 21. Alternatively, idler wheel 70 may be of other material such as non-corrosive steel or hard plastic.

It will also be seen that by mechanism described above and illustrated in the drawings, the anti-skid wheels 20 are coupled by the sets of springs 38 to the box frame 13 of the car through the elevator bar 31, screw 32, thrust bearings 33 and elevator housing 30. Thus, surface irregularities which cause the anti-skid wheels 20 to move up and down are cushioned from the car body by the sets of springs 38.

The advantages of the mechanism disclosed in the present application over prior art mechanism have already been mentioned but may be restated or summarized as follows:

A first and important advantage is that as the auxiliary wheels are lowered and pressed into tire-compressing contact with the road surface, the reaction is transferred from the sprung frame of the motor vehicle to the unsprung rear axle 14. This enables a considerably greater downward force to be exerted on the anti-skid wheels than would be the case if the upward reaction forces were solely against the sprung body of the car.

A second advantage is that by reason of the spring-loaded piston, idler wheel 70 is maintained in tight frictional engagement with the tread surfaces of both the rear drive tire 15 and the studded snow tire 21, irrespective of irregularities in the road surface or tire wear.

A third advantage of the mechanism disclosed in the present application is that the weight of the auxiliary wheels in storage position is carried by the sprung frame of the car, and is isolated from the unsprung rear drive wheels.

Without intending to be limited as to sizes, dimensions or materials, the following information may be helpful:

Assuming a 28-inch diameter auxiliary wheel, the top of elevator housing 30 may be about 34 inches above ground. The springs 38 on rods 36 may be preloaded to 200 pounds each for a total of 800 pounds. Idler wheel 70 may be an aluminum wheel having a diameter of 6 inches. Cylinder 50 may have an overall length of 9 inches. Its interior is preferably square, and the head 55 of piston 51 is square, 2 inches on a side. The auxiliary wheel 20 may be so positioned that when in lowered position, the spacing between the treads of the two tires 15 and 21 is about 1.5 inches.

Various modifications may be made within the limits defined in the appended claims. For example, lever bar 81 may, in some instances, be supported from elevator carriage 60 instead of from elevator bar 31.

What is claimed is:

1. An anti-skid mechanism for a motor vehicle having a sprung frame, rear drive wheels mounted on unsprung rear axles, and a housing for said rear axles, said anti-skid mechanism comprising:

a. a pair of auxiliary wheels equipped with anti-skid tire means;
  b. support means for said auxiliary wheels connected to the frame of said vehicle;
  c. said support means including elevator means connected to said auxiliary wheels for lowering said auxiliary wheel-tires into contact with the surface of the ground behind the rear drive wheels and for raising said auxiliary wheels into storage position;
  d. said elevator means including a pair of vertical screw stems, one on each side of said vehicle, an elevator bar driven by each screw stem, an elevator carriage supported from each screw-driven elevator bar, an auxiliary axle carried by each elevator carriage on which said auxiliary wheel is freely rotatable, and a plurality of vertical spring-loaded rods extending between said elevator bar and said elevator carriage for supporting said elevator carriage from said screw-driven elevator bar;
  e. means coupled between said elevator means and said rear-axle housing for applying an upward jacking force to the rear-axle housing when said auxiliary wheel tires are lowered into ground-contact position;
  f. said means coupled between said elevator means and said rear-axle housing including a lever bar on each side of said vehicle, means connecting the rearward end of the lever bar to the screw-driven elevator bar, flexible link means connecting an intermediate point on said lever bar to a fixed point on said frame, and means on the rear-axle housing adapted to be engaged by the rising forward end of the lever bar as the rearward end is lowered by the elevator bar;
g. means coupled between the tires of said rear drive wheels and said auxiliary wheels when in lowered position for driving and braking said auxiliary wheels;
h. said means coupled between the tires of the rear-drive wheels and auxiliary wheels including:
  h-1. an idler wheel freely rotatable above and between said rear drive wheel and said auxiliary wheel;
  h-2. a spring-loaded piston and cylinder assembly;
  h-3. means connecting one end of the piston and cylinder assembly to the idler wheel; and
  h-4. means connecting the other end of the piston and cylinder assembly to the elevator carriage for pulling down said idler wheels when said carriage is lowered.

2. Apparatus according to claim 8 characterized in that:
  a. said idler wheel is rotatable on a stub connected to the upper end of said piston.

* * * * *